US012783093B2

(12) United States Patent
Nakamura et al.

(10) Patent No.: US 12,783,093 B2
(45) Date of Patent: Nov. 3, 2026

(54) CONTROLLER APPARATUS AND SENSOR

(71) Applicant: Sony Interactive Entertainment Inc., Tokyo (JP)

(72) Inventors: Hitoshi Nakamura, Tokyo (JP); Yumi Ueda, Chiba (JP); Toshiyuki Ando, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 155 days.

(21) Appl. No.: 18/843,521

(22) PCT Filed: Mar. 24, 2022

(86) PCT No.: PCT/JP2022/014190
§ 371 (c)(1),
(2) Date: Sep. 3, 2024

(87) PCT Pub. No.: WO2023/181312
PCT Pub. Date: Sep. 28, 2023

(65) Prior Publication Data
US 2025/0190079 A1 Jun. 12, 2025

(51) Int. Cl.
*G06F 3/044* (2006.01)

(52) U.S. Cl.
CPC .................................. *G06F 3/0443* (2019.05)

(58) Field of Classification Search
CPC ......... G06F 3/0443; G06F 3/044; G06F 3/041
See application file for complete search history.

(56) References Cited

U.S. PATENT DOCUMENTS

| | | | | |
|---|---|---|---|---|
| 10,824,281 | B2 | 11/2020 | Kong | |
| 11,269,471 | B2 | 3/2022 | Lin | |
| 2013/0265221 | A1* | 10/2013 | Lee | H04N 21/4222 345/156 |
| 2015/0277617 | A1* | 10/2015 | Gwin | G06F 3/0447 345/174 |
| 2017/0215284 | A1* | 7/2017 | Ng | B33Y 80/00 |
| 2017/0277341 | A1* | 9/2017 | Lim | G06F 3/04166 |
| 2018/0299972 | A1* | 10/2018 | Saito | G06F 3/04845 |
| 2018/0300006 | A1* | 10/2018 | Lim | G06F 3/044 |
| 2018/0364832 | A1 | 12/2018 | Kong | |
| 2019/0038955 | A1* | 2/2019 | Hansen | A63B 43/00 |
| 2019/0346974 | A1 | 11/2019 | Lin | |

(Continued)

FOREIGN PATENT DOCUMENTS

| | | |
|---|---|---|
| JP | 2008113719 A | 5/2008 |
| JP | 2018524721 A | 8/2018 |

(Continued)

OTHER PUBLICATIONS

International Search Report for corresponding PCT Application No. PCT/JP2022/014190, 4 pages, dated Jun. 14, 2022.

(Continued)

*Primary Examiner* — MD Saiful A Siddiqui
(74) *Attorney, Agent, or Firm* — Kilpatrick Townsend & Stockton LLP

(57) ABSTRACT

There are provided a deformable controller main body and at least one sensor disposed on or in the vicinity of the surface of the controller main body, the sensor having an electrode formed of an elastic conductive material.

11 Claims, 5 Drawing Sheets

(56) References Cited

U.S. PATENT DOCUMENTS

| | | | | |
|---|---|---|---|---|
| 2020/0278740 | A1* | 9/2020 | Gonzalez Franco | ... G06F 3/044 |
| 2024/0269465 | A1* | 8/2024 | Baldwin | ............ A61N 1/36034 |

FOREIGN PATENT DOCUMENTS

| | | | |
|---|---|---|---|
| JP | 2019197548 | A | 11/2019 |
| WO | 2021192115 | A1 | 9/2021 |

OTHER PUBLICATIONS

JP2024-509620, "Office Action", Nov. 4, 2025, 9 pages.
"SOFTii: Soft Tangible Interface for Continuous Control of Virtual Objects with Pressure-Based Input", Tangible, Embedded, and Embodied Interaction (TEI), Jan. 15-19, 2015, pp. 539-544.
EP22933452.9, "Extended European Search Report", Jan. 7, 2026, 9 pages.

* cited by examiner (a)

(b)

CONTROLLER APPARATUS AND SENSOR

TECHNICAL FIELD

The present invention relates to a sensor and a controller apparatus equipped with the sensor.

BACKGROUND ART

Heretofore, controllers for use with video games have been formed of plastics and like materials that are relatively resistant to elastic deformation.

Meanwhile, recent years have witnessed an increasing use of techniques for vibration and kinesthetic sense presentation intended to enhance users' gaming experiences.

SUMMARY

Technical Problem

Under the above circumstances, proposals have been made to fabricate a controller main body using deformable materials to provide a controller apparatus capable of enhancing haptic experiences.

However, attempts to arrange electrostatic capacitance sensors designed to detect, for example, physical contact of the user with the surface of the controller main body formed of the deformable materials have met difficulty in causing free deformation of the controller main body because of the electrodes of existing electrostatic capacitance sensors not being deformable. This has led to the problem of the users losing the sense of unity with the controller in terms of touch feel.

The present invention has been made in view of the above circumstances and provides, as an object, a controller apparatus equipped with a sensor fit for the case where the main body of the controller apparatus is made deformable.

Solution to Problem

In order to solve the above problem, according to one embodiment of the present invention, there is provided a controller apparatus including a controller main body configured to be deformable, and at least one sensor configured to be disposed on or in the vicinity of the surface of the controller main body. The sensor has an electrode formed of an elastic conductive material.

Advantageous Effect of Invention

According to the present invention, there is provided a controller apparatus equipped with a sensor fit for the case where the main body of the controller apparatus is made deformable.

DESCRIPTION OF EMBODIMENT

Figure 1:
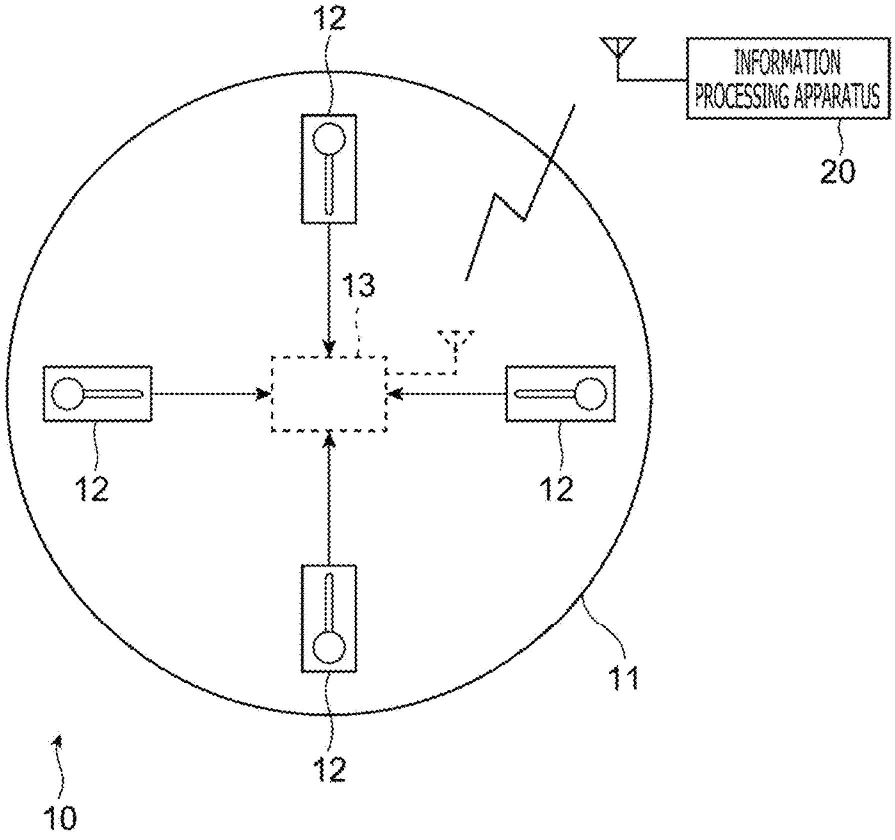
FIG. 1 is a schematic block diagram depicting a configuration and connection example of a controller apparatus according to an embodiment of the present invention.

A preferred embodiment of the present invention is described below with reference to the accompanying drawings. A controller apparatus 10 as one embodiment of the present invention is configured to have a controller main body 11, sensors (e.g., electrostatic capacitance sensors 12 in this case) disposed on or in the vicinity of the surface of the controller main body 11, and a circuit part 13, as depicted in FIG. 1. The controller apparatus 10 is communicably connected with an information processing apparatus 20 in a wired or wireless manner.

The controller main body 11 is formed of deformable materials such as polymer gel materials including silicon-based polymer gel materials and urethane-based gel materials; or elastically deformable materials such as elastomer materials including polystylene-based elastomer, olefin-based elastomer, polyvinyl chloride-based elastomer, polyurethane-based elastomer, polyester-based elastomer, and polyamide-based elastomer. The deformation here is meant to include elastic deformation, bending, sliding, and twisting.

The controller main body 11 has a predetermined shape such as a sphere or a cuboid when not subjected to an external force. The controller main body 11 changes its shape elastically in response to the external force applied thereto by the user with fingertips, for example. At least one electrostatic capacitance sensor 12 is disposed on or in the vicinity of the surface of the controller main body 11. Further, the circuit part 13 is disposed inside the controller main body 11.

It is to be noted that the vicinity of the surface in this context means an internal space of the controller main body 11 relatively close to its surface. Specifically, the vicinity of the surface refers to a range in which the sensors such as electrostatic capacitance sensors 12 can detect the user's action on the controller main body 11. Accordingly, the range of the vicinity varies for each sensor and depending on the material of the controller main body 11. For example, in the case where the electrostatic capacitance sensors 12 are adopted as the sensors, the vicinity is defined as the range in which user's physical contact with the surface of the controller main body 11 can be detected by the sensors.

Although the sensors are not limited to the electrostatic capacitance sensors 12 as in the above example, the electrostatic capacitance sensors will be used in the description below for the purpose of clarification.

Figure 2:
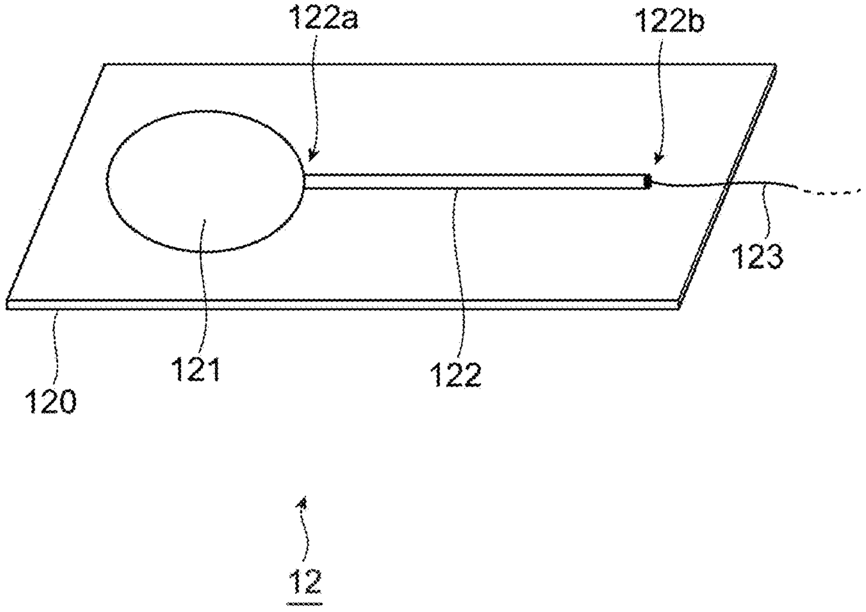
FIG. 2 is a schematic perspective view of an exemplary electrostatic capacitance sensor disposed in the controller apparatus according to the embodiment of the present invention.

Each of the electrostatic capacitance sensors 12 is configured to have a base part 120, an electrode 121, a lead part 122, and a wiring part 123 as depicted in FIG. 2. Here, the base part 120 is a thin film-like member formed by use of an elastic insulating material (e.g., an insulating organic silicon compound). The electrode 121 and the lead part 122 are formed on the base part 120. The base part 120 may be formed integrally with the controller main body 11.

The electrode 121 is formed of an elastic conductive material on the base part 120. The electrode 121 is formed to have a predetermined shape having a predetermined area. For example, a conductive ink material may be used as the conductive material forming the electrode 121. The predetermined shape of the electrode 121 in this case may be circular, elliptical, rectangular, coiled, or polygonal, for example. The electrode 121 may be ring-like in shape and have an outer periphery of one of the above shapes.

The lead part 122 has an end 122*a* electrically connected to the electrode 121. The lead part 122 is formed of an elastic conductive material in a line shape having a predetermined width on the base part 120. As in the case of the electrode 121, a conductive ink material, for example, may be used as the conductive material with which to form the lead part 122.

One end of the wiring part 123 is electrically connected to the end 122*b* opposite to the end 122*a* connected to the electrode 121. The other end of the wiring part 123 is connected to the circuit part 13. The wiring part 123 is disposed in such a manner as not to come into electrical contact with the wiring part 123 of any other electrostatic capacitance sensor 12 disposed on or in the vicinity of the surface of the controller main body 11.

It is to be noted that the electrostatic capacitance sensors 12 of this example may be self-capacitance sensors or mutual capacitance sensors. It is preferred here that the Young's modulus of the base part 120 be less than that of the controller main body 11 (i.e., the base part 120 should preferably be more elastic than the controller main body 11). It is also preferred that the Young's moduli of the electrode 121 and the lead part 122 be less than the Young's modulus of the base part 120.

Figure 3:
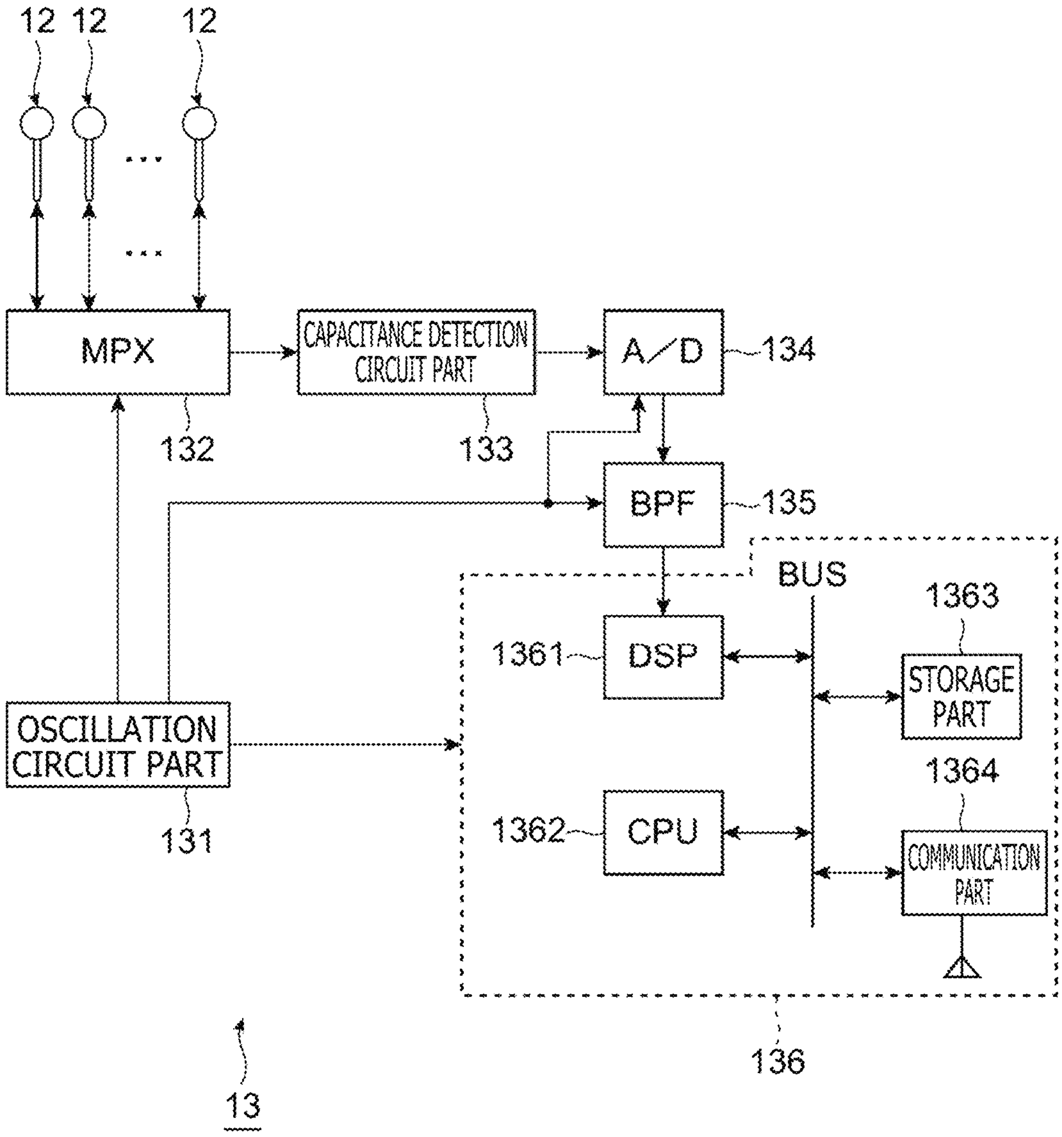
FIG. 3 is a block diagram depicting an exemplary circuit part of the controller apparatus according to the embodiment of the present invention.

The circuit part 13 is disposed in the central part of the controller main body 11 of the controller apparatus 10 (at a location as far from the surface as possible). As depicted in FIG. 3, for example, the circuit part 13 includes an oscillation circuit part 131, an analog multiplexer (MPX) 132, a capacitance detection circuit part 133, an analog/digital (A/D) conversion part 134, a band pass filter (BPS) part 135, and a control part 136. The control part 136 includes a digital signal processor (DSP) 1361, a central processing unit (CPU) 1362, a storage part 1363, and a communication part 1364. The DSP 1361, the CPU 1362, the storage part 1363, and the communication part 1364 are connected with each other via a bus (BUS).

The oscillation circuit part 131 is an oscillation circuit that oscillates a sine wave of a predetermined frequency f. The oscillation circuit part 131 outputs the oscillated sine wave signal to the analog multiplexer 132, the A/D conversion part 134, the BPF part 135, and the control part 136.

When multiple electrostatic capacitance sensors 12 are disposed on or in the vicinity of the surface of the controller main body 11, the analog multiplexer 132 selects one of the multiple electrostatic capacitance sensor 12 after another at a predetermined timing (in a predetermined cycle T sufficiently larger than the cycle t of the sine wave signal, i.e., Tt), and outputs the sine wave signal output from the oscillation circuit part 131, to the selected electrostatic capacitance sensor 12.

The capacitance detection circuit part 133 includes an inductor-capacitor (LC) resonant circuit, for example, outputting a resonance signal in resonance with the sine wave signal output to the electrostatic capacitance sensor 12 currently selected by the analog multiplexer 132. The frequency f of the resonance signal varies depending on the distance from the electrostatic capacitance sensor 12 selected by the analog multiplexer 132 to the user's hand or fingertips or on a push-in force (contact area) applied by the user's hand or fingertips to the electrostatic capacitance sensor 12.

The A/D conversion part 134 converts, to a digital signal, the signal of the frequency f' output from the capacitance detection circuit part 133, and outputs the digital signal resulting from the conversion. The BPF part 135 is a digital band-pass filter. From among the digital signals (signals of the frequency f') output from the A/D conversion part 134, the BPF part 135 extracts signals of a frequency component near a predetermined frequency f0.

The DSP 1361 of the control part 136 performs predetermined digital signal processing on the signal output from the BPF part 135, and outputs the processed signal to the CPU 1362. The CPU 1362 operates in accordance with programs stored in the storage part 1363, and determines differences between the signal output from the DSP 1361 and the signal of the frequency f output from the oscillation circuit part 131. On the basis of the detected differences, the CPU 1362 obtains information regarding the electrostatic capacitance sensor 12 currently selected by the analog multiplexer 132, regarding the distance from the selected sensor to the user's hand or fingertip, or regarding a pressing force applied by the user's hand or fingertips to the electrostatic capacitance sensor 12 before outputting the acquired information (referred to as the proximity contact information).

The storage part 1363 holds the programs to be executed by the CPU 1362. The programs may be provided and recorded on non-transitory computer-readable storage media and may be copied into the storage part 1363. The storage part 1363 also serves as a work memory for the CPU 1362.

The communication part 1364 may be a wireless communication interface such as a wireless local area network (LAN) interface or Bluetooth (registered trademark). In accordance with instructions input from the CPU 1362, the communication part 1364 outputs information to the information processing apparatus 20. The communication part 1364 also outputs the information received from the information processing apparatus 20 to the CPU 1362.

In this embodiment, the CPU 1362 of the controller apparatus 10 detects the electrostatic capacitance of each of the electrostatic capacitance sensors 12 selected successively by the analog multiplexer 132 and, on the basis of the detected electrostatic capacitance, outputs, to the information processing apparatus 20, the distance from the sensor to the user's hand or fingertip or the proximity contact information regarding the pressing force applied by the user's hand or fingertips to the electrostatic capacitance sensor 12.

Figure 4:
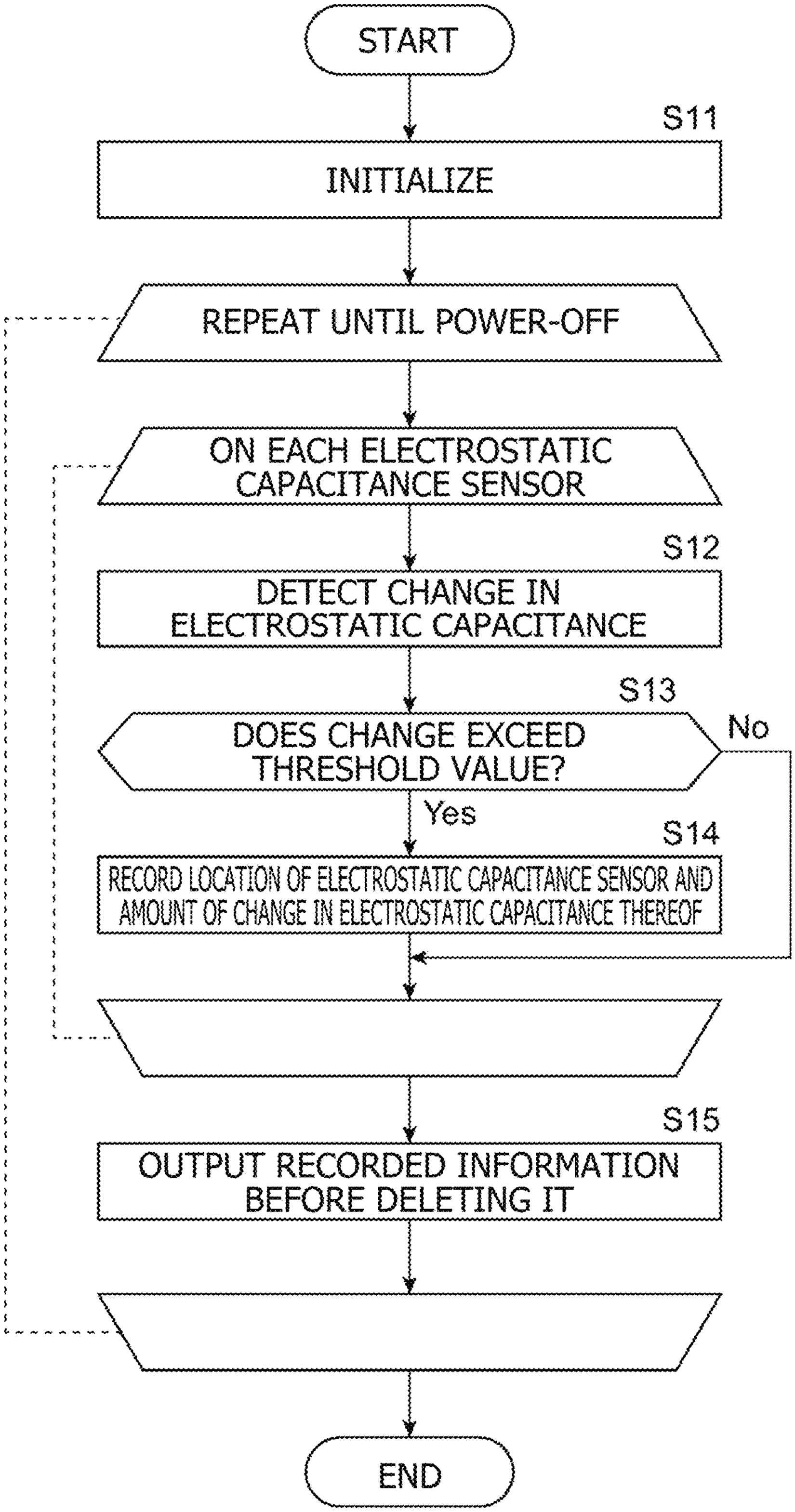
FIG. 4 is a flowchart indicating an example of information processing by the controller apparatus according to the embodiment of the present invention.

Specifically, as depicted in FIG. 4, the CPU 1362 of the controller apparatus 10 is initialized (S11) on startup (at power-on). The CPU 1362 then detects changes in the electrostatic capacitance of each electrostatic capacitance sensor 12 disposed on or in the vicinity of the surface of the controller main body 11 (S12). The CPU 1362 determines whether or not there is any change in electrostatic capacitance exceeding a predetermined threshold value (S13).

If the change in electrostatic capacitance is found here to exceed the predetermined threshold value (S13: Yes), the CPU 1362 stores information identifying the electrostatic capacitance sensor 12 (i.e., information identifying the disposed location) in association with a value indicative of the magnitude of the detected change (S14). The CPU 1362 then returns to step S12 to continue processing the next electrostatic capacitance sensor 12.

If, in step S13, the change in electrostatic capacitance detected in step S12 is not found to exceed the predetermined threshold value (S13: No), the CPU 1362 returns to step S12 to continue processing the next electrostatic capacitance sensor 12.

The CPU 1362 repeatedly executes steps S12 through S14 on each electrostatic capacitance sensor 12. Upon completing the processing of all electrostatic capacitance sensors 12, the CPU 1362 outputs to the information processing apparatus 20 (S15) the information identifying the electrostatic capacitance sensor 12 of which the electrostatic capacitance has changed beyond the predetermined threshold value (information identifying the disposed location) and the information giving the value indicative of the magnitude of the detected change (proximity contact information).

Thereafter, the CPU 1362 repeatedly executes steps S12 through S14 on each electrostatic capacitance sensor 12 and also performs step S15 until power-off.

The information processing apparatus 20 may be a home-use game machine, a personal computer, or some other computer devices, for example. The information processing apparatus 20 is communicably connected with the controller apparatus 10. In this embodiment, the information processing apparatus 20 acquires the distance from each electrostatic capacitance sensor 12 disposed on or in the vicinity of the controller main body 11 of the controller apparatus 10 to the user's hand or fingertip, or the proximity contact information regarding the pressing force applied by the user's hand or fingertips to each electrostatic capacitance sensor 12, the distance and the proximity contact information being received from the controller apparatus 10.

On the basis of the proximity contact information regarding each electrostatic capacitance sensor 12, the information processing apparatus 20 estimates the deformation of the controller main body 11. For example, as depicted conceptually in Subfigure (a) of FIG. 5, it is assumed that the electrostatic capacitance sensors 12*a*, 12*b*, 12*c*, and 12*d* are disposed at intervals of 90 degrees on a virtual great circle C on the surface of the controller main body 11 that substantially forms a sphere.

Figure 5:
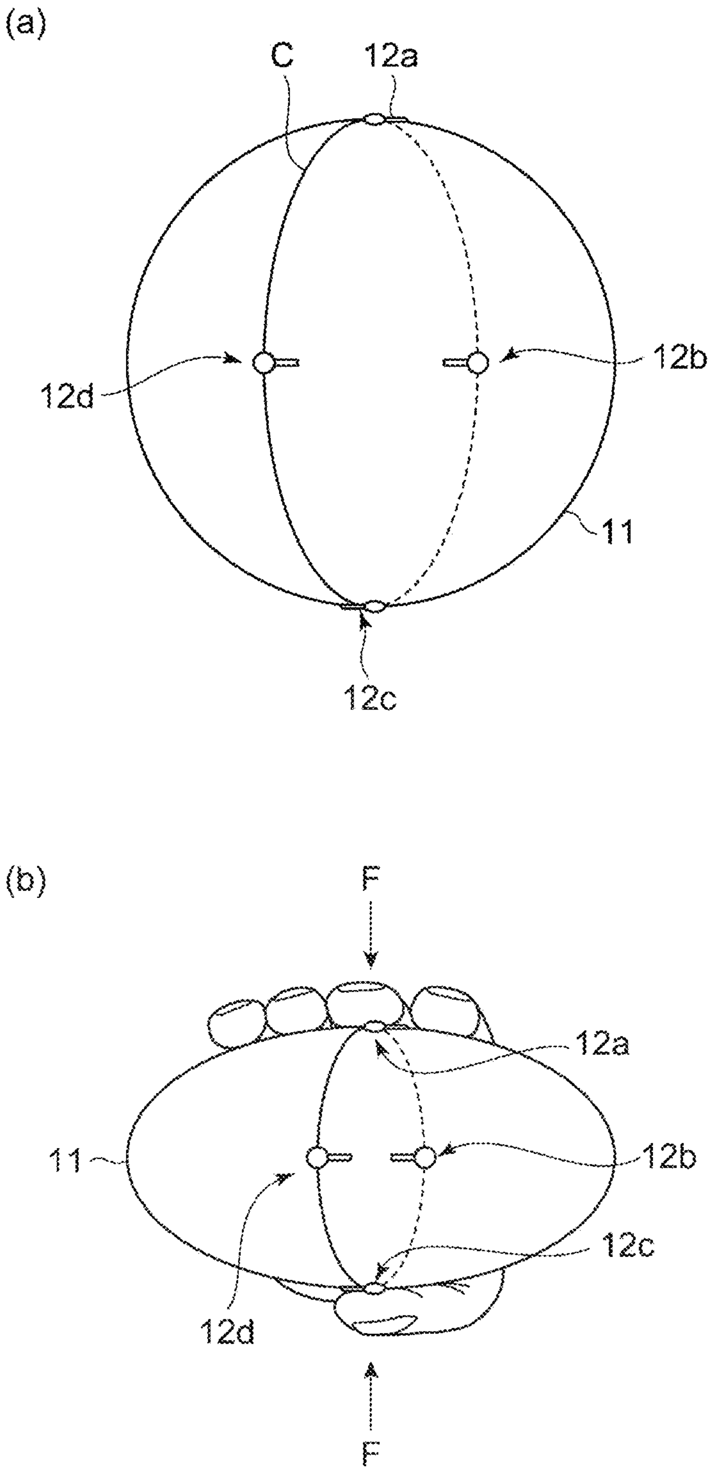
FIG. 5 depicts explanatory diagrams depicting exemplary states of elastic deformation of the controller apparatus according to the embodiment of the present invention.

Here, if the user pushes the electrostatic capacitance sensors 12*a* and 12*c* 12*d* from both sides to deform the controller main body 11 into a flat shape as depicted in Subfigure (b) of FIG. 5, a pressing force F is applied by the user's fingertips to the electrostatic capacitance sensors 12*a* and 12*c* whereas the electrostatic capacitance sensors 12*b* and 12*d* are free of contact with the user's fingertips. As a result, the controller apparatus 10 outputs, for example, the proximity contact information such as the following:

electrostatic capacitance sensor 12*a*: C1
electrostatic capacitance sensor 12*c*: C2
where, C1 and C2 represent the changes in the electrostatic capacitance of each of the electrostatic capacitance sensors 12*a* and 12*c*, respectively.

Upon receipt of the proximity contact information, the information processing apparatus 20 estimates that there is no change in the electrostatic capacitance of each of the electrostatic capacitance sensors 12*b* and 12*d* not identified by information included in the proximity contact information and that the user's pressing pressure at these locations is zero.

The information processing apparatus 20 also estimates the user's pressing force F at the locations where the electrostatic capacitance sensors 12 identified by information included in the proximity contact information are disposed, on the basis of the values of the corresponding changes in electrostatic capacitance. Well-known methods can be adopted to estimate the pressing force based on the changes in electrostatic capacitance.

The information processing apparatus 20 thus estimates the user's pressing force F at the location where each electrostatic capacitance sensor 12 of the controller apparatus 10 is disposed in a manner such as the following:

electrostatic capacitance sensor 12*a*: F
electrostatic capacitance sensor 12*b*: 0
electrostatic capacitance sensor 12*c*: F
electrostatic capacitance sensor 12*d*: 0

The information processing apparatus 20 estimates the deformation of the controller main body 11 by use of such pieces of the estimated information. Specifically, in the above example, the information processing apparatus 20 estimates that the electrostatic capacitance sensors 12*a* and 12*c* of the controller main body 11 are pressed from both sides so that the controller main body 11 is deformed into a flat shape.

The above estimation is only an example. The information processing apparatus 20 is only required to estimate the deformation of the controller apparatus 10 on the basis of the proximity contact information obtained therefrom and according to experimentally and previously obtained relations between proximity contact information and the deformation of the controller apparatus 10.

Advantageous Effects of the Embodiment

According to the example of the embodiment discussed above, there is provided a sensor fit for the case where the main body of the controller apparatus is made deformable. The electrode 121 and the lead part 122 of the sensor are disposed in a manner avoiding the wiring of other sensors, which prevents interference between the wiring parts in terms of electrostatic capacitance.

[Another exemplary configuration of the electrostatic capacitance sensor] The electrostatic capacitance sensor 12 of this embodiment is not limited to the configuration in which the electrode 121 and the lead part 122 are disposed on the base part 120 and the lead part 122 is connected with the wiring part 123, as depicted in FIG. 2.

Figure 6:
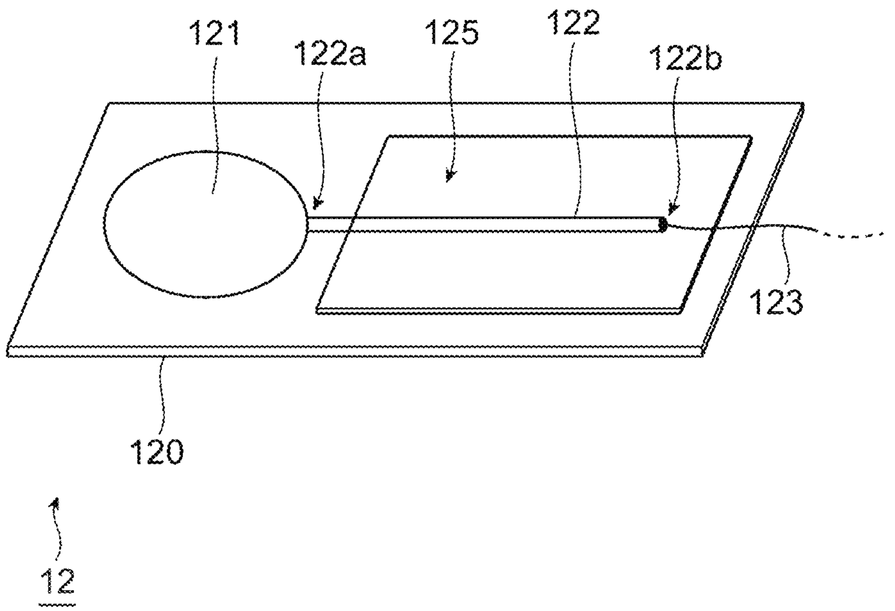
FIG. 6 depicts schematic perspective views of another exemplary electrostatic capacitance sensor disposed in the controller apparatus according to the embodiment of the present invention.
Figure 6:
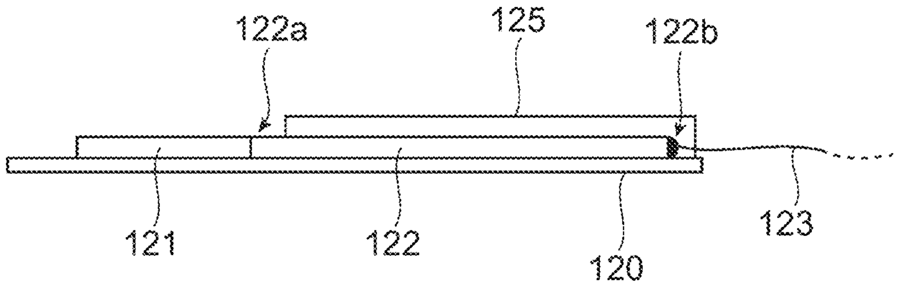

In another example, as depicted in the perspective view ((a) and the cross-sectional view (b)) of FIG. 6, the electrode 121 and the lead part 122 may be disposed on the base part 120, the lead part 122 being connected with the wiring part 123, the lead part 122 being further covered at least partially by a covering body 125.

The covering body 125 is made by use of an elastic insulating material (e.g., insulating organic silicon compound) as with the base part 120. The covering body 125 is formed as a thin film-like member as in the case of the base part 120.

In this example, too, the electrode 121 is formed of an elastic conductive material such as a conductive ink material. The lead part 122 also has the end 122*a* electrically connected to the electrode 121 and is formed of an elastic conductive material in a line shape having a predetermined width on the base part 120.

In this example, that is, the electrostatic capacitance sensor 12 is constituted by the base part 120 as a base layer formed of an elastic insulating material starting from near the inside of the controller main body 11, by the electrode 121 and lead part 122 each formed of an elastic insulating material, and by the covering body 125 as a covering layer at least partially covering the lead part 122, all stacked in this order. For example, the covering body 125 may partially expose (not cover) the end of the lead part 122 on the side of the electrode 121 while covering the end of the lead part 122 on the side of the wiring part 123.

Here, it is preferred that the Young's modulus of the covering body 125 serving as the covering layer be approximately equivalent to that of the base part 120 (i.e., the covering body 125 and the base part 120 should preferably have an approximately equivalent level of elasticity).

When the electrostatic capacitance sensors 12 of this example are used on or in the proximity of the surface of the controller main body 11, the value of the change in electrostatic capacitance upon contact with the electrode 121 is made different from the value of the change in electrostatic capacitance upon contact with the lead part 122, which improves the accuracy of detection. In addition, even if the lead parts 122 of other electrostatic capacitance sensors 12 overlap with each other, the lead parts 122 do not come into electrical contact with one another. Thus disposed, the electrostatic capacitance sensors 12 do not interfere with each other in terms of electrostatic capacitance, which enhances the degree of freedom in disposing the electrostatic capacitance sensors 12.

REFERENCE SIGNS LIST

10: Controller apparatus
11: Controller main body
12: Electrostatic capacitance sensor
13: Circuit part
20: Information processing apparatus
120: Base part
121: Electrode
122: Lead part
123: Wiring part
125: Covering body
131: Oscillation circuit part
132: Analog multiplexer
133: Capacitance detection circuit part
134: A/D conversion part
135: BPF part
136: Control part
1361: DSP
1362: CPU
1363: Storage part
1364: Communication part

The invention claimed is:

1. A controller apparatus comprising:
a controller main body configured to be deformable;
a first sensor configured to be disposed on or in a vicinity of a first surface of the controller main body;
a second sensor configured to be disposed on or in a vicinity of a second surface of the controller main body, wherein the second surface is opposite from the first surface, wherein the first sensor and the second sensor have a respective electrode formed of an elastic conductive material; and
a circuit part configured to be disposed inside of the controller main body and configured to be in communication with the first sensor and the second sensor, wherein the circuit part comprises at least one processor and is further configured to:
determine, based on a first change in capacitance of the first sensor and a second change in capacitance of the second sensor, information related to a pressing force applied to the first sensor or the second sensor; and
output information identifying at least one sensor of the first sensor and the second sensor of which the first change in capacitance or the second change in capacitance has exceeded a predetermined threshold value, the controller apparatus communicably connected with an information processing apparatus configured to estimate a deformation of the controller main body based on the information provided by the controller apparatus.

2. The controller apparatus according to claim 1, wherein:
the first sensor and the second sensor have the respective electrode formed of the elastic conductive material and a respective lead part electrically connected to the respective electrode and formed of the elastic conductive material, and
each lead part is covered partially by an elastic insulating material.

3. The controller apparatus according to claim 1, wherein:
the first sensor and the second sensor include a base layer formed of an elastic insulating material starting from near an inside of the controller main body, and an electrode layer having the respective electrode formed of the elastic conductive material, and
the electrode layer has a respective lead part electrically connected to the respective electrode and formed of the elastic conductive material, the respective lead part being covered partially by a covering layer formed of the elastic insulating material.

4. The controller apparatus of claim 3, wherein the base layer of the first sensor and the second sensor is more elastic than the controller main body.

5. The controller apparatus according to claim 1, wherein the first sensor or the second sensor is an electrostatic capacitance sensor.

6. The controller apparatus according to claim 1, wherein the controller main body is elastically deformable.

7. The controller apparatus of claim 1, wherein the controller main body has a shape including one of a sphere, an ellipsoid, or a cuboid.

8. The controller apparatus of claim 1, wherein the circuit part is further configured to determine the information related to the pressing force applied to the first sensor or the second sensor subsequent to determining that the first change in capacitance and the second change in capacitance exceeds the predetermined threshold value.

9. The controller apparatus of claim 1, wherein the controller apparatus is configured to output information indicating a magnitude of the first change in capacitance or the second change in capacitance.

10. The controller apparatus of claim 1, wherein the circuit part is further configured to:
select a sensor from a set of sensors of the controller apparatus, the set of sensors comprising the first sensor and the second sensor;
output an oscillated signal to the selected sensor;
subsequent to outputting the oscillated signal, output a resonance signal in resonance with the oscillated signal to the selected sensor;
detect one or more differences between a first frequency signal determined by processing the resonance signal and a second frequency signal corresponding to the oscillated signal; and
determine, based on the one or more differences, the information related to the pressing force.

11. A method of determining information related to a pressing force applied to a controller apparatus, the method comprising:
selecting a sensor from a set of sensors disposed on or in a vicinity of a controller main body of the controller apparatus that is configured to be deformable, the set of sensors comprising i) a first sensor disposed on or in a vicinity of a first surface and ii) a second sensor disposed on or in a vicinity of a second surface of the controller main body that is opposite from the first surface, wherein the first sensor and the second sensor have a respective electrode formed of an elastic conductive material;

outputting, by a circuit part disposed inside of the controller main body and in communication with the set of sensors, an oscillated signal to the selected sensor;

subsequent to outputting the oscillated signal, outputting, by the circuit part, a resonance signal in resonance with the oscillated signal to the selected sensor;

detecting, by the circuit part, one or more differences between a first frequency signal determined by processing the resonance signal and a second frequency signal corresponding to the oscillated signal; and determining, by the circuit part and based on the one or more differences, the information related to the pressing force.

* * * * *